United States Patent [19]

Coetzer et al.

[11] Patent Number: 4,797,333
[45] Date of Patent: Jan. 10, 1989

[54] ELECTROCHEMICAL CELL

[75] Inventors: Johan Coetzer, Pretoria; Roger J. Wedlake, Johannesburg, both of South Africa

[73] Assignee: Lilliwyte Societe Anonyme, Luxembourg, Luxembourg

[21] Appl. No.: 57,368

[22] Filed: Jun. 2, 1987

[30] Foreign Application Priority Data

Jun. 6, 1986 [GB] United Kingdom ............... 8613800

[51] Int. Cl.$^4$ ..................... H01M 6/00; H01M 10/44
[52] U.S. Cl. ..................... 429/103; 429/50; 29/623.1; 204/2.1; 204/68
[58] Field of Search ............ 204/2.1, 59, 68; 429/103, 50; 29/623.1

[56] References Cited

U.S. PATENT DOCUMENTS

| | | | |
|---|---|---|---|
| 715,625 | 12/1902 | Taddei | 204/68 |
| 3,523,986 | 4/1971 | Greenberg | 429/103 |
| 3,671,322 | 6/1972 | King et al. | 429/103 |
| 4,529,676 | 7/1985 | Galloway et al. | 429/103 X |
| 4,546,055 | 10/1985 | Coetzer et al. | 429/103 |
| 4,560,627 | 12/1985 | Bones et al. | |
| 4,592,969 | 6/1986 | Coetzer et al. | |
| 4,626,483 | 12/1986 | Bones et al. | |

Primary Examiner—Stephen J. Kalafut
Attorney, Agent, or Firm—Arnold, White & Durkee

[57] ABSTRACT

The invention provides a method of making an electrochemical cell. The method comprises loading, into the cathode compartment of the cell an alkali metal aluminium halide molten salt electrolyte having the formula MAlHal$_4$ wherein M is the alkali metal of the separator and Hal is a halide; an alkali metal halide MHal wherein M and Hal are respectively the same alkali metal and halide as in the molten salt electrolyte; aluminium; and an active cathode substance which includes a transition metal T selected from the group conprising Fe, Ni, Co, Cr, Mn and mixtures thereof. An electrochemical cell precursor is thereby made. When the precursor is subjected to charging at a temperature at which the molten salt electrolyte and alkali metal M are molten, aluminium reacts with the alkali metal halide MHal to produce further said molten salt electrolyte and to form said alkali metal M, the alkali metal M passing through the separator into the anode compartment. After all the aluminium has reacted with the alkali metal halide to provide a cell in a discharged state, the active cathode substance is halogenated, with further alkali metal M being produced and passing through the separator into the anode compartment, the proportions of alkali metal halide MHal, molten salt electrolyte and aluminium loaded into the cathode compartment being selected so that when the cell is fully charged and all the available active cathode substances has been halogenated, the proportion of alkali metal ions and aluminium ions in the electrolyte being selected such that the solubility of the active cathode substance in the molten electrolyte is at or near its minimum.

30 Claims, 1 Drawing Sheet

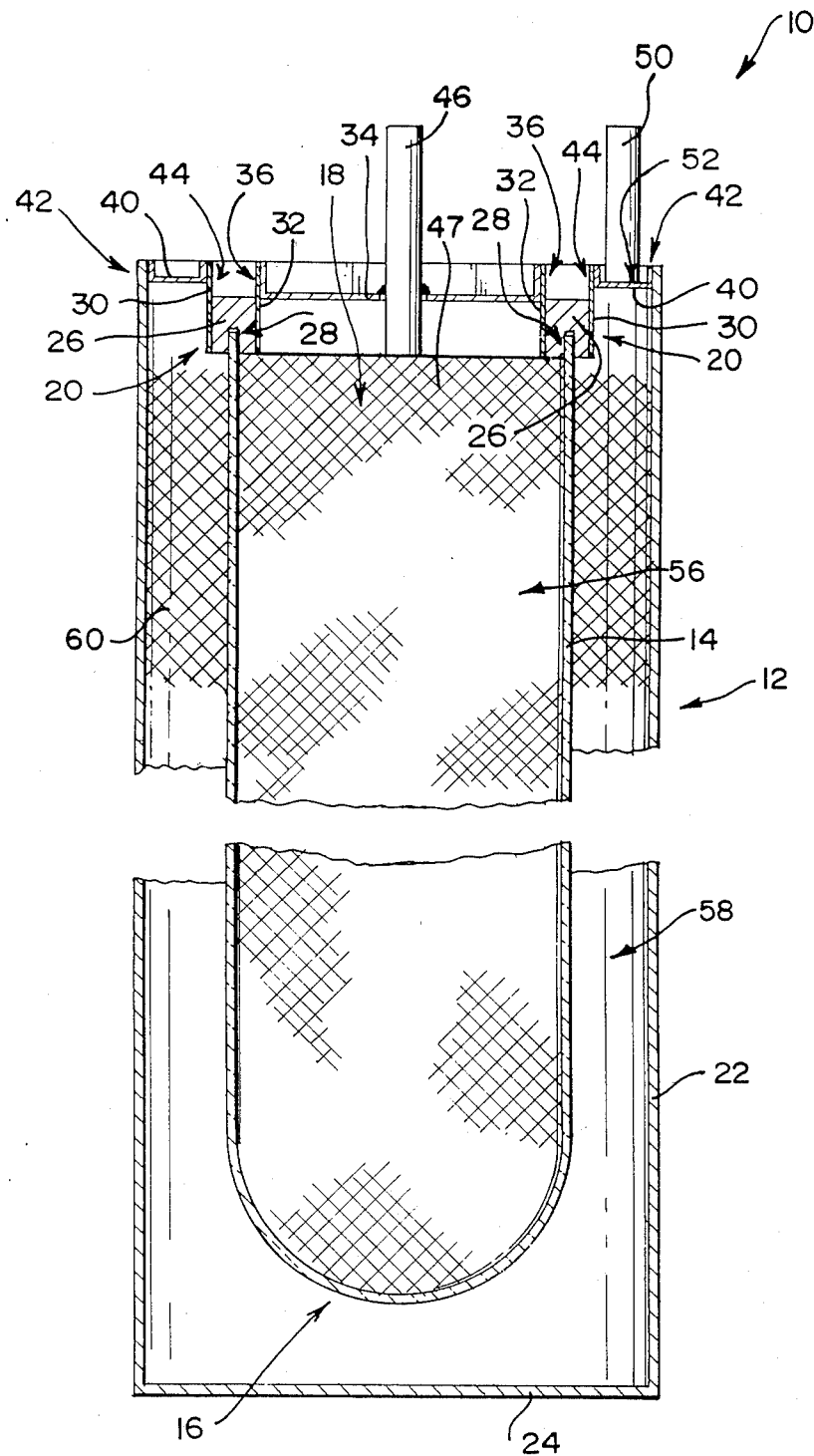

ELECTROCHEMICAL CELL

This invention relates to a method of making an electrochemical cell. The invention relates also to a precursor for a high temperature electrochemical cell.

According to a first aspect of the invention, there is provided a method of making an electrochemical cell of the type comprising an anode compartment containing, at the operating temperature of the cell and when the cell is in its discharged state, a molten alkali metal anode, and a cathode compartment containing, at said operating temperature and in said discharged state, an alkali metal aluminium halide metal salt electrolyte which is also molten at the operating temperature of the cell, and having the formula $MAlHal_4$, wherein M is the alkali metal of the anode and Hal is a halide, the cathode compartment containing also a cathode which comprises an electronically conductive electrolyte-permeable matrix which has dispersed therein an active cathode substance which includes a transition metal T selected from the group comprising Fe, Ni, Co, Cr, Mn and mixtures thereof, the matrix being impregnated with said electrolyte, and, separating the anode compartment from the cathode compartment, a separator which comprises a solid conductor of the ions of the alkali metal of the anode or a micromolecular sieve which contains said alkali metal sorbed therein, which method comprises loading into a cathode compartment of a cell housing comprising an anode compartment separated from a cathode compartment by a separator which is a solid conductor of ions of alkali metal M or is a micromolecular sieve which contains alkali metal M sorbed therein, an alkali metal aluminium halide molten salt electrolyte having the formula $MAlHal_4$ wherein M is the alkali metal of the separator and Hal is a halide;

an alkali metal halide M Hal wherein M and Hal are respectively the same alkali metal and halide as in the molten salt electrolyte;

aluminium; and an active cathode substance which includes a transition metal T selected from the group comprising Fe, Ni, Co, Cr, Mn and mixtures thereof, thereby to make an electrochemical cell precursor wherein, when it is subjected to charging at a temperature at which the molten salt electrolyte and alkali metal M are molten, aluminium reacts with the alkali metal halide MHal to produce further said molten salt electrolyte and to form said alkali metal M, the alkali metal M passing through the separator into the anode compartment; and after all the aluminium has reacted with the alkali metal halide to provide a cell in a discharged state, the active cathode substance is halogenated, with further alkali metal M being produced and passing through the separator into the anode compartment, the proportions of alkali metal halide MHal, molten salt electrolyte and aluminium loaded into the cathode compartment being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

During said charging, the following reactions take place in the cathode compartment:

$$3MHal + Al \rightarrow 3M + AlHal_3 \tag{1}$$

$$MHal + AlHal_3 \rightarrow MAlHal_4 \tag{2}$$

which can be represented by the overall reaction:

$$4MHal + Al \rightarrow 3M + MAlHal_4.$$

The molar proportion or ratio of alkali metal ions and aluminium ions in the electrolyte is preferably not less than one, to obtain said minimum solubility.

The method thus involves the consumption of the aluminium and alkali metal halide starting materials and the formation of additional $M\,Al\,Hal_4$ in the cathode compartment, and the migration of excess alkali metal into the anode compartment. By 'excess alkali metal' is meant more alkali metal than is required to satisfy the normal electrochemical discharging reaction in the cell, viz $$2M + THal_2 \rightarrow 2MHal + T \tag{3}$$

where T is the transition metal.

An electrochemical cell made in accordance with the method of the present invention can thus initially contain no alkali metal in its anode compartment. In other words, it can be made in fully discharged form.

Furthermore, in use, i.e. after an electrochemical cell has been subjected to at least one charge cycle, it is often highly desirable that the cell be able to take a significant degree of overdischarge. In the case of an electrochemical cell made in accordance with the method of the present invention, on overdischarge, some of the excess alkali metal in the anode compartment passes through the separator into the cathode compartment. The excess alkali metal hence ensures that, when overdischarging the cell, its anode compartment does not reach the potentially hazardous state of being 'dry', i.e. containing no alkali metal, or being anode limited. This can result in the separator being damaged during the overdischarge and/or during a subsequent charging cycle due to a high current density being applied to parts of the separator.

Overdischarging can be obtained, for example, when a number of such cells are connected together in a battery. There is usually a degree of capacity mismatch between the cells which may be aggravated as the cells are subjected to charging/discharging cycles. When the battery is cycled according to the average cell performance, at least some cells will reach an overdischarged state.

The method may include replacing some of the aluminium by zinc as a primary dopant. Sufficient zinc can then be added to replace the aluminium required to provide a cell in discharged state, as hereinbefore described, typically up to about 10% by mass of the aluminium in the cell being replaced by zinc. In other words, enough zinc may be provided so that upon charging up to the discharged state the reaction of the zinc according to reactions analogous to reaction (1) and (2), provide the initial upstarting amount sodium in the anode compartment, with the aluminium in the cathode compartment then reacting further according to the said reaction (1) and (2) during normal charging and discharging of the cell between its fully charged and fully discharged states.

Hence, when the transition metal is metallic Fe, it may be in the form of iron powder or filings, and the aluminium may then be present as a surface coating or alloy on the iron powder or filings. In particular, when the transition metal is in the form of iron filings, the aluminium may be present in the form of a surface coating, alloy, e.g. alanogously to the so-called Raney Process, sheet, rod or any other suitable form in which it is contacted with the current collector.

In yet another version of the invention, the active cathode substance may be loaded into the cathode compartment in the form of an intermediate refractory hard metal compound of said transition metal T with at least one non-metal of the group consisting of C, Si, B, N, and Al.

The active cathode substance and the alkali metal halide may be mixed together in particulate form to form a mixture, the mixture sintered to form an electrolyte-permeable matrix, and the matrix impregnated with the molten salt electrolyte prior to loading thereof into the cathode compartment. If the aluminium is then in particulate form it can form part of this mixture which is sintered.

When the transition metal is in the form of an intermediate refractory hard metal compound, the compound can be a carbide e.g. iron, chromium or manganese carbide. In other embodiments, the compound may comprise a compound of at least one of the transition metals with a plurality of the non-metals, and/or a compound of a plurality of the transition metals with at least one of the non-metals. The compound may comprise another or second transition metal which is mixed or alloyed with the other or first transition metal. The second transition metal may constitute a minor proportion, e.g. less than 30%, of the alloy or mixture.

The alkali metal, M, may be sodium, and the separator may be beta-alumina.

The halide may be chloride, so that the alkali metal halide is sodium chloride. The electrolyte may then be in the form of a sodium chloride - aluminium chloride mixture or in the form of the double salt, i.e. $NaAlCl_4$. The transition metal T of the active cathode substance may be a member of the group comprising Fe, Ni and mixtures thereof.

When the transition metal is iron, the cathode may include a small proportion of nickel and/or a chalcogen; and when the transition metal is nickel the cathode may include a small proportion of iron and/or a chalcogen such as sulphur.

When the matrix comprises at least one intermediate refractory hard metal compound it is, once said electrolyte has been impregnated therein and the NaAl and Al are incorporated therein, a cathode precursor which is coupled via the separator with the anode compartment and which becomes a cathode after it has been subjected to at least one charge cycle.

More specifically, forming the matrix may comprise sintering particles such as powders or fibres of the transition metal or intermediate retractory hard metal compound in a reducing atmosphere. Instead, forming the matrix may comprise forming a particulate mixture thereof with an organic binder, pressing the mixture into a unitary body and cracking the binder by heating the mixture under vacuum at a temperature above 400° C., which is sufficient to pyrolyse the binder. For example a carbide of the transition metal in question can be mixed with a small quantity of a carbon-forming organic binder such as phenol formaldehyde resin, the resulting mix being pressed into an electrode shape, and the resin cracked in a vacuum at a temperature above 600° C., which temperature is selected to pyrolyse the binder to conductive carbon.

Incorporating the NaCl and Al into the matrix may be effected simultaneously with the formation of the matrix, the NaCl and Al in finely divided particulate form being dispersed into the particulate material from which the matrix is formed, prior to formation of the matrix. Instead, the NaCl and Al may be incorporated into the matrix by melting the electrolyte and suspending particulate NaCl and Al in finely divided form in the molten electrolyte, prior to impregnating the electrolyte into the matrix, and then impregnating the electrolyte together with the NaCl and Al suspended therein, into the matrix.

It is hence apparent from the foregoing that the NaCl and Al may be incorporated into the matrix in any one of a number of suitable different ways.

Impregnating the molten salt electrolyte into the matrix may be by means of vacuum impregnation with the electrolyte in the molten state.

When the refractory hard metal compound is present, conditioning of the cell by subjecting it to charge/discharge cycles will be necessary to activate it by halogenation of the intermediate refractory hard metal compound to bring it up to its maximum potential operating performance in the cell.

In another more specific version of the invention, the NaCl, Al and the transition metal may be combined by forming a mixture in particulate form of NaCl, Al and the transition metal. Still more particularly, the formation of the mixture may comprise mixing together a NaCl powder, an Al powder and a powder of the transition metal or compound thereof. Suitable iron and nickel powders are available from William Rowland Limited as 'TYPE C CARBONYL' and 'TYPE 225 CARBONYL' respectively.

Instead, the NaCl, Al and transition metal particles can be mixed after loading thereof into the cathode compartment.

The powder mixture may then be impregnated, e.g. saturated with the electrolyte, which may be effected simply by wetting the mixture with the electrolyte in molten liquid form, for example after the powder mixture has been packed, for example by tamping, into the cathode compartment. This will, in effect, provide a cathode precursor in a discharged state, which can then be activated by charging.

In the charging reaction of this precursor, the metal or intermediate refractory hard metal compound component of the mixture is chlorinated, sodium being produced during the chlorination, which sodium moves through the separator in ionic form, into the anode compartment where it exists in the charged or partially charged cell as molten sodium metal, electrons passing during the charging along the external circuit from the cathode compartment to the anode compartment. When making a cell in accordance with the present invention, it is accordingly in principle unnecessary to provide any sodium in the anode compartment, the sodium being produced during activation in the first charging cycle, although it may be desirable to charge a starting amount of sodium into the anode compartment to provide for current collection and to facilitate charging by wetting the separator. However, it is essential that the anode compartment current collector be in intimate electrical contact with substantially the entire separator, to ensure proper function of the cell on initial charging.

Although the powder mixture may be charged in powder form after saturation with liquid electrolyte, the method may include as mentioned hereinbefore the additional step of sintering the powder mix to form a macroporous electrolyte permeable matrix prior to saturation with electrolyte, and activation by taking it through one or more charge cycles as a cathode to chlorinate it.

The invention also extends to an electrochemical cell, when made according to a method as hereinbefore described.

According to a second aspect of the invention, there is provided a precursor for a high temperature electrochemical cell which comprises a cell housing having an anode compartment and a cathode compartment separated from each other by a separator which comprises a solid conductor of ions of an alkali metal M or a micromolecular sieve which contains alkali metal M sorbed therein, the cathode compartment containing:

an alkali metal aluminium halide molten salt electrolyte having the formula $MAlHal_4$ wherein M is the alkali metal of the separator and Hal is a halide;

a cathode which comprises an active cathode substance which includes a transition metal T selected from the group comprising Fe, Ni, Co, Cr, Mn and mixtures thereof;

aluminium; and an alkali metal halide M Hal wherein M is the alkali metal of the separator and Hal is the halide of the molten salt electrolyte, the precursor being chargeable at a temperature at which the molten salt electrolyte and the alkali metal M are molten, to cause the aluminium to react with the alkali metal halide M Hal to form further said molten salt electrolyte and to form alkali metal M, the alkali metal M passing through the separator into the anode compartment, and, after all the aluminium has reacted with the alkali metal halide to provide a cell in a discharged state, to charge the cell by causing the active cathode substance to be halogenated while further alkali metal passes through the separator into the anode compartment, the proportions of alkali metal halide MHal, molten salt electrolyte and aluminium in the cathode compartment being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

As mentioned hereinbefore, the active cathode substance as well as the alkali metal halide may be in particulate form with the alkali metal halide being mixed with the active cathode substance, and the mixture being impregnated with the molten salt electrolyte. The aluminium may be particulate and form part of said mixture.

In another embodiment of the invention, the cathode may comprise an electronically conducted electrolyte-permeable matrix in which the active cathode substance and alkali metal halide are dispersed, the matrix being impregnated with the molten salt electrolyte.

In yet another embodiment of the invention, the cathode of the cell may comprise an electronically conductive electrolyte permeable macroscopically porous matrix having a chlorinated nickel-containing active cathode substance dispersed therein and the electrolyte and/or active cathode substance containing a minor proportion of a suitable chalcogen dispersed therein for resisting a progressive drop in the capacity of the cathode with repeated charge/discharge cycling thereof.

The substance may include $NiCl_2$ itself, one or more compounds of nickel which have been chlorinated, or combinations of the aforegoing. In a particular embodiment, the matrix itself may comprise nickel, with the substance comprising $NiCl_2$. Instead, the matrix may comprise a material which does not contain nickel, the substance then comprising an intermediate refractory hard metal compound of nickel, such as a phosphide, boride or silicide thereof, which has been activated by halogenation.

It will be appreciated that minor quantities of impurities may be tolerated in the electrolyte, i.e. substances which will ionize in the molten electrolyte to provide ions which affect the electrochemical action of the electrolyte, but the quantity of such impurities should be insufficient to alter the essential character of the electrolyte as an $MAlHal_4$ system as defined. The cell may include zinc in place of some of the aluminium, as a primary dopant, as hereinbefore described.

When the cathode includes iron as a transition metal in conjunction with a beta-alumina solid electrolyte or separator, it may also include a protective cathode substance which oxidizes by chlorination at a voltage less than the open circuit voltage of the $Fe/FeCl_3//Na$ plateau, and greater than the open circuit voltage of the cathode in its fully charged state when coupled with a sodium anode. This is required to prevent or inhibit formation of free $FeCl_3$, which would poison the beta-alumina, hence resulting in the cell resistance increasing.

The cathode may comprise $Fe/FeCl_2$ as an active cathode substance dispersed in the matrix, the protective cathode substance oxidizing by chlorination at a voltage greater than the open circuit voltage of the $Fe/FeCl_2//Na$ plateau.

The protective cathode substance may be dispersed in finely divided form through the cathode, and the protective cathode substance may be selected from the group consisting in $Ni/NiCl_2$, $Co/CoCl_2$ and combinations of $Ni/NiCl_2$ and $Co/CoCl_2$.

When the separator is a micromolecular sieve, it may be a tectosilicate, e.g. a felspar, felspathoid or zeolite. When it is a zeolite, the zeolite may be a synthetic zeolite such as zeolite 3A, 4A, 13X, or the like. Preferably, however, the separator is a solid conductor of sodium ions such as beta-alumina or nasicon. For example, a beta-alumina tube can be used. The interior of the tube may be used as the anode compartment, with the tube being located in a cell housing which defines a cathode compartment outside the tube, in the interior of the housing, and with an anode compartment current collector being in intimate electrical contact with substantially the entire separator. The tube will be sealed and may be evacuated prior to charging to resist undesirable pressure build-up therein as sodium moves into the anode compartment during charging, through the tube wall. In this specification, beta-alumina is used broadly to include all phases of sodium-ion conducting beta-alumina, such as beta"-alumina.

To spread the sodium over the inside of the tube wall and to effect said intimate contact of the anode compartment current collector with the separator, suitable wicking material, electrically connected to the current collector and containing finely divided electrically conductive particles, may be spread over the wall surface. The material may, for example, be iron mesh, optionally tinned. This mesh hence acts as a part of an anode current collector, and may be attached to an evacuation pipe of the same metal, used to evacuate the tube interior prior to charging and projecting out of the cell to form the remainder of the anode current collector.

The main current collector of the cathode of the cell of the present invention will usually be the housing itself which may be a metal such as the metals employed in the cathode powder combination or mixture. In this case, the housing may be the same metal as that of the powder mixture, or one with a higher charging potential, so that it remains metallic at all times. To improve the initial activation or charging characteristics of the cell, the cathode current collector may include a metal mesh or gauze connected, for example by welding, to the housing.

For close packing in batteries, the cell may have an elongate rectangular housing along the interior of which the tube extends in a more or less central position. To facilitate wicking in the anode compartment, the cell may be used horizontally, but this can lead to voids in the cathode compartment formed upon charging as the sodium moves into the anode compartment. For this reason, the cell may incorporate an electrolyte reservoir, more or less separate from but in communication with the cathode compartment, from which the electrolytes can pass, for example by draining under gravity, into the cathode compartment to keep it flooded with liquid electrolytes at all times. Naturally, for close packing, cells of similar construction but having an hexagonal cross-section can be employed instead.

The electrolyte may include a minor proportion of sodium fluoride as secondary dopant. This combats potential progressive internal resistance rise on cell cycling and the invention accordingly contemplates incorporating a small proportion of sodium fluoride in the powder mix from which the cathode is formed, when it contains Fe as an active cathode substance. This sodium fluoride dissolves in the liquid electrolyte, in use. The electrolyte should be selected so that, at all states of charge, the solubility therein of $FeCl_2$ is at a minimum. This is achieved when the electrolyte comprises a mixture of sodium halide and aluminium halide in a 1:1 mole ratio, with the molten salt being in the presence of at least some solid sodium chloride at all stages of charge, i.e. a neutral electrolyte. The only alkali metal present should be the sodium as other alkali metals can adversely affect the beta-alumina separator, and, although pure sodium aluminium chloride can be used, said minor proportion of up to 10% on a molar basis or more of the electrolyte may be made up of sodium fluoride. The sodium fluoride will replace the equivalent proportion of sodium chloride, so that said 1:1 mole ratio is retained. The proportion of sodium fluoride will, however, be sufficiently low for the electrolyte to retain its essential character as a sodium aluminium chloride electrolyte. There must thus be enough sodium chloride, as mentioned above, for some solid sodium chloride to remain in the cathode compartment when the cell is fully charged, i.e. to maintain minimum solubility.

As mentioned hereinbefore, the liquid electrolyte and/or active cathode substance may contain a minor proportion of a suitable chalcogen dispersed therein for resisting a progressive drop in the capacity of the cathode with repeated charge/discharge cycling of the cell, when the cathode contains, in the matrix, a chlorinated nickelcontaining substance dispersed therein as the active cathode substance.

The chalcogen may comprise one or more species, such as selenium or sulphur, or compounds containing sulphur such as a transition metal sulphide. The chalcogen is preferably in extremely finely divided form, and it or reaction products between it and components of the liquid electrolyte may even be dissolved in the electrolyte.

The invention will now be described, by way of example, with reference to the accompanying diagrammatic drawing, in which the single figure shows a schematic sectional side elevation of an electrochemical cell in accordance with the present invention.

In the drawing, reference numeral 10 generally indicates an electrochemical cell in accordance with the invention.

The cell 10 includes an outer cylindrical casing 12 having a side wall 22 connected to a circular floor 24; a beta-alumina tube 14 located concentrically within the casing 12, the tube 14 being closed at its one end 16 and open at its other end 18; and a collar assembly 20 around the end 18 of the tube 14. The collar assembly 20 comprises a circular insulating ring 26 of alpha-alumina, with the end 18 of the tube 14 mounted to the ring 26 by being sealingly located in an annular grove 28 in the ring. Two concentric truncated cylinders of nickel, designated 30,32, are bonded fluid tightly to the outer and inner curved surfaces respectively of the ring 26. An annular closure disc 34 closes off the open end 18 of the tube 14, the disc 34 being secured to the truncated cylinder or ring 32 at 36. An annular disc 40 also closes off the end of the casing 12 remote from the floor 24, the disc 40 being secured, e.g. welded, to the casing at 42 and to the ring 30 at 44. A steel rod current collector 46 projects into the tube 14, and a steel rod current collector 50 protrudes from the disc 40 at 52. The current collector 46 is electrically connected to a porous wicking layer 47 lining the inside of the separator tube 14, i.e. in intimate contact with the tube 14, with finely divided electrically conductive particles, e.g. Ni and/or Fe particles incorporated in the layer.

An anode compartment 56 is hence provided inside the tube 14, with a cathode compartment 58 being provided around the outside of the tube 14, within the casing 12, the beta-alumina tube 14 hence constituting a separator between the anode and cathode compartments.

Into the cathode compartment 58 there is placed an electrolyte permeable matrix 60 of Fe, with sodium chloride and aluminium powder incorporated therein in dispersed form. The anode compartment 56 initially contains no anode material. Sufficient molten $NaAlCl_4$ electrolyte is then added to the cathode compartment so that the matrix is impregnated with the electrolyte and the electrolyte wets the separator or tube 14. The beta-alumina tube 14 hence forms a continuous barrier between the electrolyte containing cathode compartment 58 and the anode compartment 56, within the housing 12. Initially, the layer 47 ensures the required electrical contact between the collector 46 and the separator 16. However, on the first sodium passing through the separator it 'wicks' along the layer 47 thereby providing further electrical contact between the anode compartment and the separator.

The cathode compartment 58 contain sufficient NaCl and Al so that, on charging the cell 10, the following reactions take place in the cathode compartment:

$$3NaCl + Al \rightarrow 3Na + AlCl_3 \quad (1)$$

$$NaCl + AlCl_3 \rightarrow NaAlCl_4 \quad (2)$$

$$NaCl + Fe \rightarrow Na + FeCl_2 \quad (3)$$

The Na generated by reactions (1) and (3) passes through the beta-alumina into the anode compartment. Hence, the Na generated by reaction (1) is excess Na, which will permit overdischarging of the cell as hereinbefore described. A small amount of starting Na can be provided in the anode compartment, in molten form, to connect the current collector 46 to the separator 14, but it is envisaged that this will not normally be the case since an anode which is initially sodium-free provides important advantages e.g. the cell can be transported readily and safely.

However, once the cell has been subjected to repeated charge/discharge cycles, the "excess" sodium chloride initially present in the cathode compartment will ensure that there is at all times sufficient sodium in the anode compartment to keep the entire surface of the separator 14 covered with sodium, even when the cell is over discharged as hereinbefore described. Failure to keep the entire separator covered with sodium will lead to high current densities being imposed on the separator, resulting in inefficient operation i.e. anode limited and possible premature failure.

Furthermore, the aluminium which is initially introduced into the cathode compartment should be located in such a manner that the Al Cl$_3$ which is formed will not readily poison the separator 14. For example, the aluminium may be in the form of thin sheets (not shown) located physically remote from the separator 14 and electrically connected to the cathode current collector 50.

While the invention has been described with particular reference to the use of an aluminium-based electrolyte and aluminium in the cathode, some of the aluminium in the cathode compartment, e.g. up to about 10% by mass, can be substituted by Zn as a primary dopant. Hence, when zinc is used, reactions (1), (2) and (4) become, respectively $$2MHal + Zn \rightarrow 2M + ZnHal_2 \quad (5)$$

$$MHal + ZnHal_2 \rightarrow M\,ZnHal_3 \quad (6)$$

$$2M + MZnHal_3 \rightarrow 3MHal + Zn \quad (7)$$

which occur side by side with reactions (1), (2) and (4).

We claim:

1. A method of making an electrochemical cell of the type comprising an anode compartment containing, at the operating temperature of the cell and when the cell is in its discharged state, a molten alkali metal anode, and a cathode compartment containing, at said operating temperature and in said discharged state, an alkali metal aluminium halide molten salt electrolyte which is also molten at the operating temperature of the cell, and having the formula MalHal$_4$ wherein M is the alkali metal of the anode and Hal is a halide, the cathode compartment containing also a cathode which comprises an electronically conductive electrolyte-permeable matrix which has dispersed therein an active cathode substance which includes a transition metal T selected from the group comprising Fe, Ni, Co, Cr, Mn and mixtures thereof, the matrix being impregnated with said electrolyte, and, separating the anode compartment from the cathode compartment, a separator which comprises a solid conductor of the ions of the alkali metal of the anode or a micromolecular sieve which contains said alkali metal sorbed therein, which method comprises loading, into a cathode compartment of a cell housing comprising an anode compartment separated from a cathode compartment by a separator which is a solid conductor of ions of alkali metal M or is a micromolecular sieve which contains alkali metal M sorbed therein, a matrix precursor, capable of becoming an electronically conductive electrolyte-permeable matrix on the cell being subjected to at least one charge cycle;

an alkali metal aluminium halide molten salt electrolyte having the formula MAlHal$_4$ wherein M is the alkali metal of the separator and Hal is a halide;

an alkali metal halide MHal wherein M and Hal are respectively the same alkali metal and halide as in the molten salt electrolyte;

aluminium; and an active cathode substance which includes a transition metal T selected from the group consisting Fe, Ni, Co, Cr, Mn and mixtures thereof, thereby to make an electrochemical cell precursor wherein, when it is subjected to charging at a temperature at which the molten salt electrolyte and alkali metal M are molten, aluminium reacts with the alkali metal halide MHal to produce further said molten salt electrolyte and to form said alkali metal M, the alkali metal M passing through the separator into the anode compartment; and after all the aluminium has reacted with the alkali metal halide to provide a cell in a discharged state, the active cathode substance is halogenated, with further alkali metal M being produced and passing through the separator into the anode compartment, the proportions of alkali metal halide MHal, molten salt electrolyte and aluminium loaded into the cathode compartment being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

2. A method as claimed in claim 1, in which the alkali metal M is sodium, the separator is beta-alumina, and the halide Hal is a chloride.

3. A method as claimed in claim 1, in which the aluminium is loaded into the cathode compartment in metallic form.

4. A method as claimed in claim 3, in which the aluminium is loaded into the cathode compartment in particulate form.

5. A method as claimed in claim 1, in which the active cathode substance is loaded into the cathode compartment as the transition metal T in metallic form.

6. A method as claimed in claim 5, in which the transition metal T is in the form of an alloy with the aluminium.

7. A method as claimed in claim 6, in which the alloy is present as a surface coating on the transition metal T.

8. A method as claimed in claim 1, in which the active cathode substance is loaded into the cathode compartment in the form of an intermediate refractory hard metal compound of said transition metal T with at least one non-metal of the group comprising C, N, B, Si, and P.

9. A method as claimed in claim 1, in which the active cathode substance and the alkali metal halide M Hal are loaded into the cathode in particulate form, the particles in the cathode compartment are mixed, and the mixture is impregnated with the molten salt electrolyte.

10. A method as claimed in claim 1, in which the active cathode substance and alkali metal halide are mixed together in particulate form to form a mixture, the mixture is sintered to form an electrolyte-permeable matrix, and the matrix is impregnated with the molten salt electrolyte prior to loading thereof into the cathode compartment.

11. A method as claimed in claim 1, in which the alkali metal M is loaded into the cathode compartment in metallic form and reacts with the molten salt electrolyte to produce alkali metal halide MHal and the aluminium in metallic form.

12. A method as claimed in claim 10 in which the alkali metal is loaded into the cathode compartment impregnated into a porous carrier.

13. A method as claimed in claim 1, in which the transition metal T of the active cathode substance is a member of the group comprising Fe, Ni and mixtures thereof.

14. A precursor for a high temperature electrochemical cell which comprises a cell housing having an anode compartment and a cathode compartment separated from each other by a separator which comprises a solid conductor of ions of an alkali metal M or a micromolecular sieve which contains alkali metal M sorbed therein, the cathode compartment containing:
   an alkali metal aluminium halide molten salt electrolyte having the formula $MAlHal_4$ wherein M is the alkali metal of the separator and Hal is a halide;
   a cathode which comprises an active cathode substance which includes a transition metal T selected from the group comprising Fe, Ni, Co, Cr, Mn and mixtures thereof;
   aluminium; and
   an alkali metal halide M Hal wherein M is the alkali metal of the separator and Hal is the halide of the molten salt electrolyte,
   the precursor being chargeable at a temperature at which the molten salt electrolyte and the alkali metal M are molten, to cause the aluminium to react with the alkali metal halide M Hal to form further said molten salt electrolyte and to form alkali metal M, the alkali metal M passing through the separator into the anode compartment, and, after all the aluminium has reacted with the alkali metal halide to provide a cell in a discharged state, to charge the cell by causing the active cathode substance to be halogenated while further alkali metal passes through the separator into the anode compartment, the proportions of alkali metal halide M Hal, molten sal electrolyte and aluminium in the cathode compartment being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

15. A precursor as claimed in claim 14, in which the active cathode substance is particulate, and in which the alkali metal halide is particulate and is mixed with the active cathode substance, the mixture being impregnated with the molten salt electrolyte.

16. A precursor as claimed in claim 15, in which the aluminium is particulate and forms part of said mixture.

17. A precursor as claimed in claim 14, in which the cathode comprises an electronically conductive electrolyte-permeable matrix in which the active cathode substance and alkali metal halide are dispersed, the matrix being impregnated with the molten salt electrolyte.

18. A method of making an electrochemical cell of the type comprising an anode compartment containing, at the operating temperature of the cell and when the cell is in its discharged state, a molten alkali metal anode, and a cathode compartment containing, at said operating temperature and in said discharged state, an alkali metal aluminium halide molten salt electrolyte which is also molten at the operating temperature of the cell, and having the formula $MAlHal_4$ wherein M is the alkali metal of the anode and Hal is a halide, the cathode compartment containing also a cathode which comprises an electronically conductive electrolyte-permeable matrix which has dispersed therein an active cathode substance which includes a transition metal T selected from the group comprising Fe, Ni, Co, Cr, Mn and mixtures thereof, the matrix being impregnated with said electrolyte, and, separating the anode compartment from the cathode compartment, a separator which comprises a solid conductor of the ions of the alkali metal of the anode or a micromolecular sieve which contains said alkali metal sorbed therein, which method comprises loading, into a cathode compartment of a cell housing comprising an anode compartment separated from a cathode compartment by a separator which is a solid conductor of ions of alkali metal M or is a micromolecular sieve which contains alkali metal M sorbed therein,
   an electronically conductive electrolyte-permeable matrix;
   an alkali metal aluminium halide molten salt electrolyte having the formula $MAlHal_4$ wherein M is the alkali metal of the separator and Hal is a halide;
   an alkali metal halide MHal wherein M and Hal are respectively the same alkali metal and halide as in the molten salt electrolyte;
   aluminium; and
   an active cathode substance which includes a transition metal T selected from the group consisting Fe, Ni, Co, Cr, Mn and mixtures thereof,
   thereby to make an electrochemical cell precursor wherein, when it is subjected to charging at a temperature at which the molten salt electrolyte and alkali metal M are molten, aluminium reacts with the alkali metal halide MHal to produce further said molten salt electrolyte and to form said alkali metal M, the alkali metal M passing through the separator into the anode compartment; and
   after all the aluminium has reacted with the alkali metal halide to provide a cell in a discharged state, the active cathode substance is halogenated, with further alkali metal M being produced and passing through the separator into the anode compartment, the proportions of alkali metal halide MHal, molten salt electrolyte and aluminium loaded into the cathode compartment being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

19. A method as claimed in claim 18, in which the alkali metal M is sodium, the separator is beta-alumina, and the halide Hal is a chloride.

20. A method as claimed in claim 18, in which the aluminum is loaded into the cathode compartment in metallic form.

21. A method as claimed in claim 20, in which the aluminum is loaded into the cathode compartment in particular form.

22. A method as claimed in claim 18, in which the active cathode substance is loaded into the cathode compartment as the transition metal T in metallic form.

23. A method as claimed in claim 22, in which the transition metal T is in the form of an alloy with the aluminum.

24. A method as claimed in claim 23, in which the alloy is present as a surface coating on the transition metal T.

25. A method as claimed in claim 18, in which the active cathode substance is loaded into the cathode compartment in the form of an intermediate refractory hard metal compound of said transition metal T with at least one non-metal of the group comprising C, N, B, Si, and P.

26. A method as claimed in claim 18, in which the active cathode substance and the alkali metal halide M Hal are loaded into the cathode in particular form, the particles in the cathode compartment are mixed, and the mixture is impregnated with the molten salt electrolyte.

27. A method as claimed in claim 18, in which the active cathode substance and alkali metal halide are mixed together in particulate form to form a mixture, the mixture is sintered to form an electrolyte-permeable matrix, and the matrix is impregnated with the molten salt electrolyte prior to loading thereof into the cathode compartment.

28. A method as claimed in claim 18, in which the alkali metal M is loaded into the cathode compartment in metallic form and reacts with the molten salt electrolyte to produce alkali metal halide MHal and the aluminum in metallic form.

29. A method as claimed in claim 27 in which the alkali metal is loaded into the cathode compartment impregnated into a porous carrier.

30. A method as claimed in claim 18, in which the transition metal T of the active cathode substance is a member of the group comprising Fe, Ni and mixtures thereof.

* * * * *